(12) United States Patent
Eckert et al.

(10) Patent No.: US 8,155,596 B2
(45) Date of Patent: Apr. 10, 2012

(54) RADIO COMMUNICATION DEVICE AND METHOD FOR PROCESSING MEASUREMENT CONTROL INFORMATION IN A COMMUNICATION DEVICE

(75) Inventors: Michael Eckert, Braunschweig (DE); Martin Hans, Bad Salzdetfurth (DE); Hyung-Nam Choi, Hamburg (DE); Maik Bienas, Braunschweig (DE)

(73) Assignee: Infineon Technologies AG, Neubiberg (DE)

( * ) Notice: Subject to any disclaimer, the term of this patent is extended or adjusted under 35 U.S.C. 154(b) by 895 days.

(21) Appl. No.: 11/965,112

(22) Filed: Dec. 27, 2007

(65) Prior Publication Data

US 2009/0170441 A1 Jul. 2, 2009

(51) Int. Cl.
*H04B 17/00* (2006.01)
(52) U.S. Cl. ........... 455/67.11; 455/67.13; 455/423; 370/225; 370/252
(58) Field of Classification Search .......... 455/67.11, 455/67.13, 423, 425; 370/225, 252, 315, 370/329
See application file for complete search history.

(56) References Cited

U.S. PATENT DOCUMENTS 6,845,238 B1 * 1/2005 Muller .......................... 455/436
7,181,218 B2 * 2/2007 Ovesjo et al. .................. 455/436
7,418,260 B2 * 8/2008 Lucidarme ..................... 455/423
2002/0160785 A1 10/2002 Ovesjo et al.
2004/0248568 A1 12/2004 Lucidarme

FOREIGN PATENT DOCUMENTS

WO WO-01/20942 A1 3/2001

OTHER PUBLICATIONS

3GPP TS 36.300 V1.0.0 (Mar. 2007) Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).
PLMN selection, Cell selection/reselection (TS 23.122, TS 25.304) with an English abstract.
3GPP TS 25.331 V3.11.0 (Jun. 2002) Technical Specification; 3rd Generation Partnership Project; Technical Specification Group Radio Access Network; Radio Resource Control (RRC); Protocol Specification (Release 1999).

* cited by examiner

*Primary Examiner* — Tuan H Nguyen
(74) *Attorney, Agent, or Firm* — Dickstein Shapiro LLP

(57) ABSTRACT

In various embodiments, a communication device and a method for processing measurement control information in a communication device are provided. In an embodiment, system information and a system information identifier are stored by the communication device in a first connection state and the system information identifier is transmitted to the network communication device after changing to a second connection state.

19 Claims, 9 Drawing Sheets

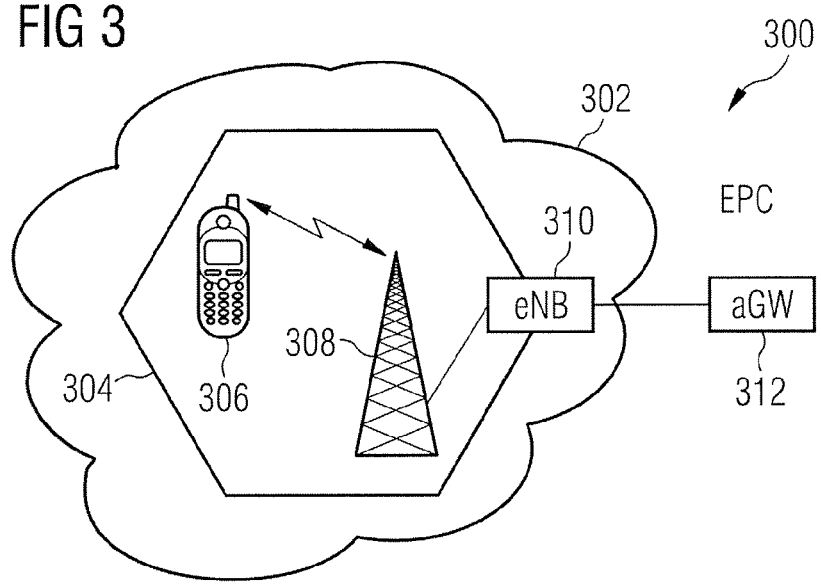
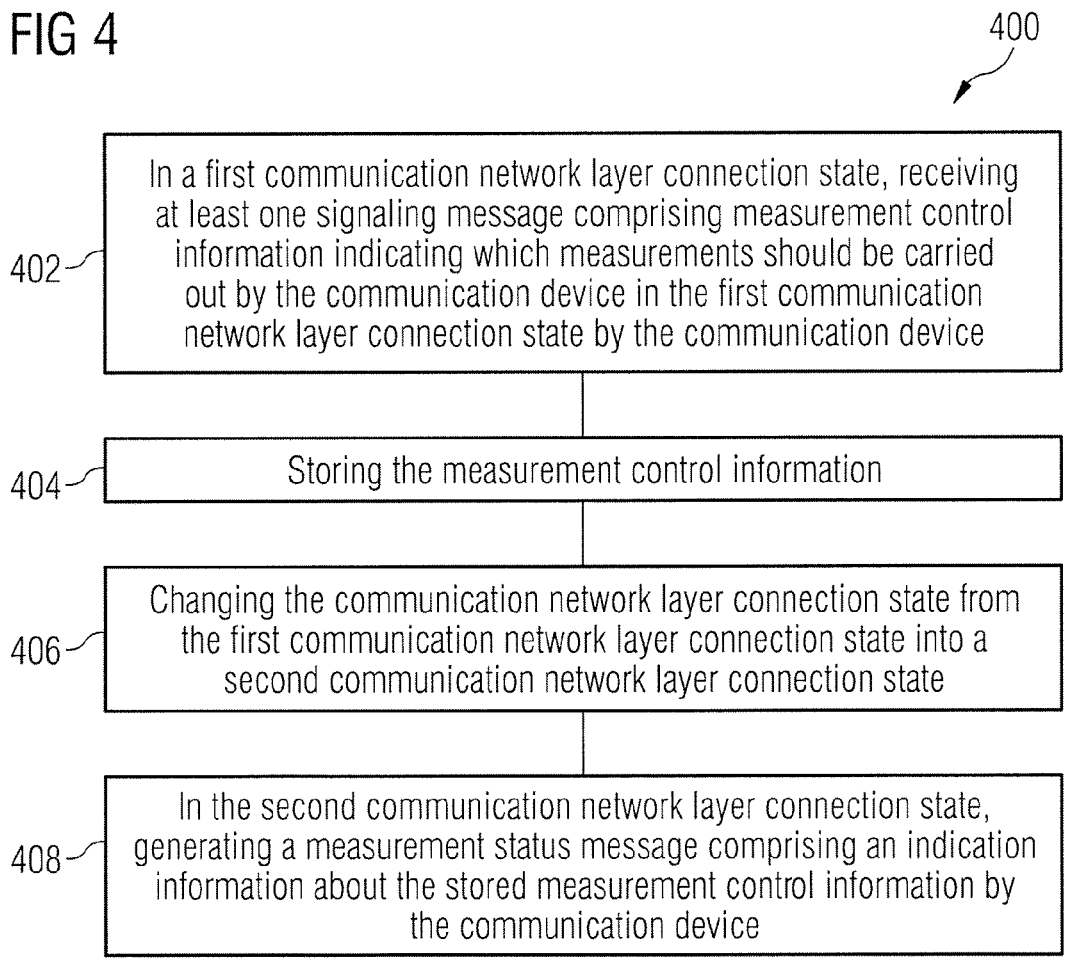

RADIO COMMUNICATION DEVICE AND METHOD FOR PROCESSING MEASUREMENT CONTROL INFORMATION IN A COMMUNICATION DEVICE

TECHNICAL FIELD

Embodiments relate generally to a radio communication device and a method for processing measurement control information in a communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of embodiments. In the following description, various embodiments are described with reference to the following drawings, in which:

FIG. 3 shows the LTE Radio Access Network;

FIG. 4 shows a first method for processing measurement control information according to an embodiment;

DESCRIPTION

Embodiments provide a communication device and a method in a cellular mobile system, in particular the LTE (Long Term Evolution) communication system.

LTE concerns an advancement of UMTS (Universal Mobile Telecommunications System) based on new OFDMA (Orthogonal Frequency Division Multiplex) multiple access method in downlink and SC-FDMA (single carrier-frequency division multiple access) in uplink communication direction.

At present discussions about an efficient signaling of control data over the LTE air interface take place in the standardization group 3GPP TSG RAN WG2 with the objective to reduce the number of control data in order to preserve the resources of the air interface and to reduce the latencies.

Embodiments provide a method that reduces the amount of control data on the air interface, that increases the available bandwidth for the transmission of user data; and that reduces the latency, e.g. for the reading of the control data and the signal processing in the mobile device.

This is achieved by using the system information for a configuration of measurements for mobile devices in the connected mode. Furthermore, a signaling over the air interface is provided, over which the mobile device may communicate the state or the version, respectively of the system information. The mobile network thereafter generates a message according to an embodiment taking into account this information for configuring the measurements in the mobile device.

As LTE is based on UMTS and the invention is at least from a technical point of view also applicable to UMTS and similar systems a short overview of the UMTS protocol stack is given in the following.

Figure 1:
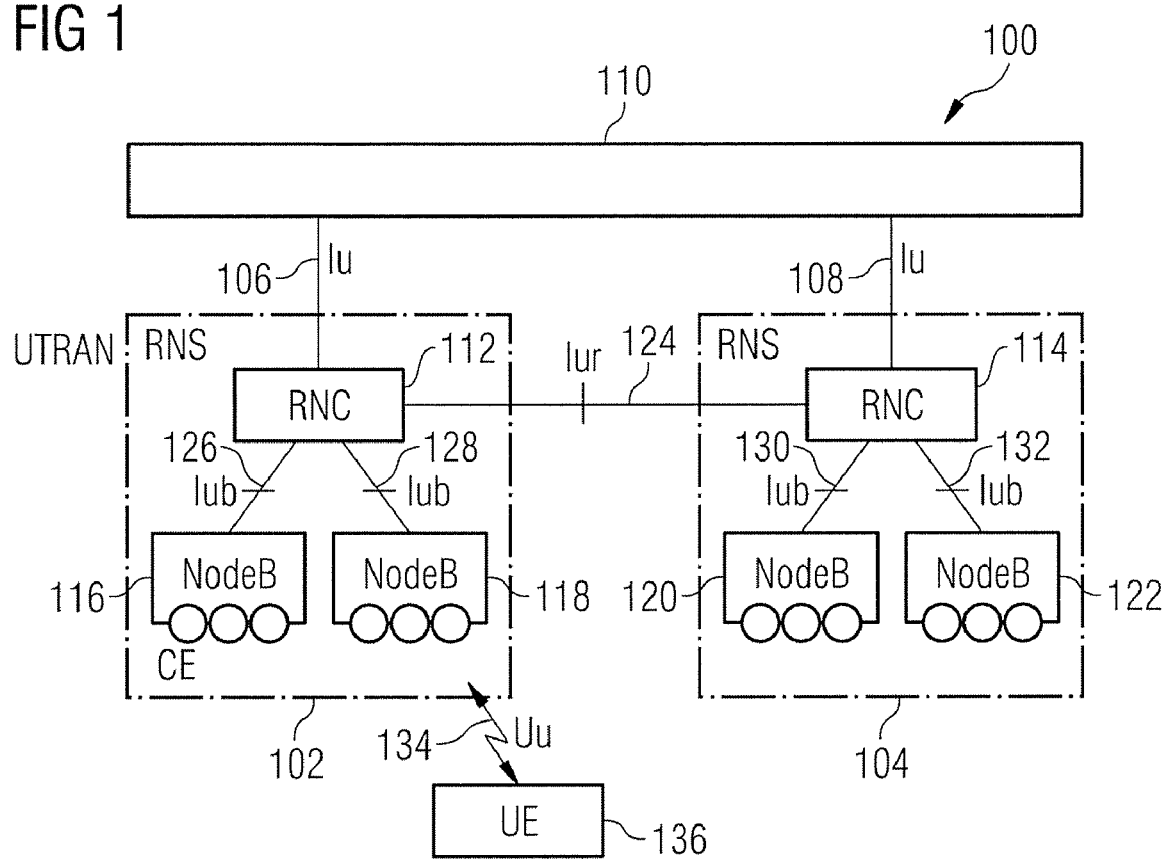
FIG. 1 shows the UMTS Mobile Radio System.

FIG. 1 shows a UMTS mobile radio system 100, for reasons of simpler illustration particularly the components of the UMTS mobile radio access network (UMTS Terrestrial Radio Access Network, UTRAN), which has a plurality of mobile radio network subsystems (RNS) 102, 104 which are respectively connected by means of an "Iu" interface 106, 108 to the UMTS core network (CN) 110. A mobile radio network subsystem 102, 104 has a respective mobile radio network control module (Radio Network Controller, RNC) 112, 114 and also one or more UMTS base stations 116, 118, 120, 122, which are also called NodeB in UMTS.

Within the mobile radio access network, the mobile radio network control modules 112, 114 of the individual mobile radio network subsystems 102, 104 are connected to one another by means of an "Iur" interface 124. Each mobile radio network control module 112, 114 respectively monitors the assignment of mobile radio resources for all the mobile radio cells in a mobile radio network subsystem 102, 104.

A UMTS base station 116, 118, 120, 122 is respectively connected to a mobile radio network control module 112, 114 associated with the base station by means of an "Iub" interface 126, 128, 130, 132.

Each UMTS base station 116, 118, 120, 122 clearly provides radio coverage for one or more mobile radio cells (CE) within a mobile radio network subsystem 102, 104. Between a respective UMTS base station 116, 118, 120, 122 and a subscriber terminal 136 (user equipment, UE), subsequently also called mobile radio terminal or mobile device, in a mobile radio cell, message signals or data signals are transmitted using an air interface, called Uu air interface 134 in UMTS, preferably using a multiple access transmission method.

A plurality of subscribers, in other words a plurality of activated mobile radio terminals 136 registered in the mobile radio access network, in the same mobile radio cell preferably have their signalling separated from one another using orthogonal codes, particularly using the "CDMA method" (Code Division Multiple Access).

In this context, it should be noted that FIG. 1 shows only one mobile radio terminal 136 for reasons of simple illustration. In general, however, any number of mobile radio terminals 136 may be provided in the mobile radio system 100.

Figure 2:
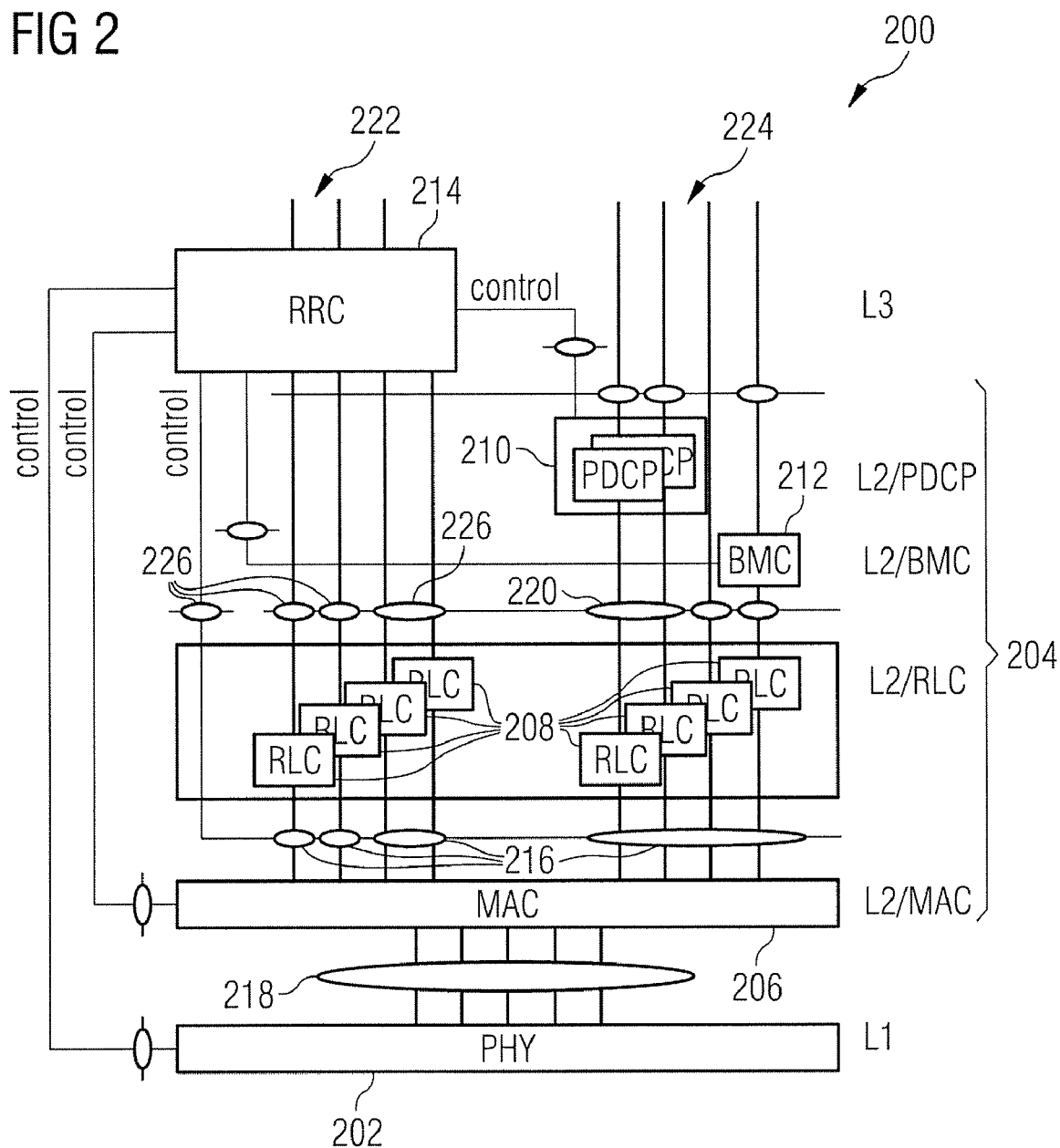
FIG. 2 shows the UMTS Air Interface communication protocol layers.

As FIG. 2 shows, the UMTS air interface 134 is logically divided into three communication protocol layers (symbolized in FIG. 2 by a communication protocol layer arrangement 200). The modules (entities) ensuring and providing the functionality of the respective communication protocol layers described below are implemented both in the mobile radio terminal 136 and in the UMTS base station 116, 118, 120, 122 or in the respective mobile radio network control unit 112, 114.

FIG. 2 shows the communication protocol structure 200 from the viewpoint of the dedicated transport channel DCH (dedicated channel).

The bottommost communication protocol layer shown in FIG. 2 is the physical layer PHY 202, which represents the communication protocol layer 1 on the basis of the OSI reference model (Open System Interconnection) of the ISO (International Standardisation Organisation). The physical layer 202 provides the MAC communication protocol layer 206 with its services via transport channels 218 and these are used to stipulate how and with what characteristics the data are to be transported via the air interface 134.

The communication protocol layer arranged above the physical layer 202 is the data link layer 204, communication protocol layer 2 on the basis of the OSI reference model, which for its part has a plurality of communication subprotocol layers, namely the Medium Access Control protocol Layer (MAC protocol layer) 206, the Radio Link Control protocol layer 208 (RLC protocol layer), the Packet Data Convergence Protocol protocol layer 210 (PDCP protocol layer), and also the Broadcast/Multicast Control protocol layer 212 (BMC protocol layer).

The topmost communication protocol layer of the UMTS air interface Uu is the mobile radio network layer (communication protocol layer 3 on the basis of the OSI reference model), having the mobile radio resource control unit 214 (Radio Resource Control protocol layer, RRC protocol layer).

Each communication protocol layer 202, 204, 206, 208, 210, 212, 214 provides the communication protocol layer above it with its services via prescribed, defined service access points 216, 218, 220, 226.

On the basis of UMTS, the communication protocol structure 200 shown in FIG. 2 may be split not just horizontally into the above described protocol layers and units of the respective communication protocol layers, but also vertically into a "control protocol plane" 222 (Control plane, C plane), which contains parts of the physical layer 202, parts of the MAC protocol layer 206, parts of the RLC protocol layer 208 and also the RRC protocol layer 214, and the user protocol plane 224 (User plane, U plane), which contains parts of the physical layer 202, parts of the MAC protocol layer 206, parts of the RLC protocol layer 208, the PDCP protocol layer 210 and also the BMC protocol layer 212.

The modules of the control protocol plane 222 are used to transmit exclusively control data, which are required for establishing and releasing and also maintaining a communication link, whereas the modules of the user plane 224 are used to transmit the actual useful data.

The MAC protocol layer 206 or the units of the MAC protocol layer 206 provides or provide the RLC protocol layer 208 with its or their services using logical channels 216 as service access points and these are used to characterize what type of data the transported data involve. The task of the MAC protocol layer 206 in the transmitter, i.e. during data transmission in the uplink direction in the mobile radio terminal 136, is particularly to map the data which are present on a logical channel 216 above the MAC protocol layer 206 onto the transport channels 218 of the physical layer 202. The physical layer 202 provides the transport channels 218 with discrete transmission rates for this.

Using the RLC protocol layer 208 or using the modules of the RLC protocol layer 208, the RRC protocol layer 214 is provided with its services by means of signalling radio bearers (SRB) 226 as service access points, and the PDCP protocol layer 210 and the BMC protocol layer 212 are provided with their services by means of radio bearers (RB) 220 as service access points. The signalling radio bearers and the radio bearers characterize the way in which the RLC protocol layer 208 needs to handle the data packets. To this end, by way of example, the RRC protocol layer 214 stipulates the transmission mode for each configured signalling radio bearer or radio bearer.

The RLC protocol layer 208 is modelled such that there is an independent RLC entity for each radio bearer or signalling radio bearer. In addition, the task of the RLC protocol layer or of its entities 208 in the transmission device is to split or assemble the useful data and the signalling data from radio bearers or signalling radio bearers into data packets. The RLC protocol layer 208 transfers the data packets produced after the split or the assembly to the MAC protocol layer 206 for further transport or for further processing.

The PDCP protocol layer 210 or the units of the PDCP protocol layer 210 is or are set up to transmit or to receive data from the "Packet Switched Domain" (PS domain). The main function of the PDCP protocol layer 210 is to compress or decompress the IP header information (Internet Protocol header information).

The BMC protocol layer 212 or its entities is or are used to transmit or to receive "cell broadcast messages" via the air interface.

The RRC is a sublayer of Layer 3 in the control plane. The RRC protocol layer 214 or the entities of the RRC protocol layer 214 is or are responsible for establishing and releasing and reconfiguring physical channels, transport channels 218, logical channels 216, signalling radio bearers 226 and radio bearers 220, creation and management of broadcasting of system information, paging of mobile devices, setup of RRC measurement settings and management of measurement report and also for negotiating all of the parameters of the communication protocol layer 1, i.e. of the physical layer 202 and of the communication protocol layer 2.

To this end, the RRC modules, i.e. the modules of the RRC protocol layer 214, in the mobile radio network control module 112, 114 and the respective mobile radio terminal 136 interchange appropriate RRC messages, e.g. via the signalling radio bearers 226.

Layers such as e.g. the Sublayer RRC of the communication protocol layer 3 may contain different connection states. A special connection state may be, as an example, an idle state where the communication device has no connection with the mobile radio network and where it is inactive. Other states are the CELL_FACH, the URA_PCH, the CELL_PCH and the CELL_DCH. The difference of these states in connected mode consists of the UE connection level, and the channels which can be used. These states and their transitions are explained further below in this description.

Conventionally, in UMTS system information is transmitted over the broadcast channel in system information messages which are transmitted in so-called System Information Blocks (SIBs). The structure of the SIBs is explained in more detail further below in this description.

One of these System Information Blocks, the "SIB11", e.g. notifies the mobile device (UE) on which radio cells measurements are to be taken, when the mobile device is in one of the states CELL_FACH, the URA_PCH, the CELL_PCH or Idle state. For that, amongst others, the information element "Cell Info" is transmitted which contains several parameters describing the radio cells, as e.g. the Primary CPICH (Common Pilot Channel) info. This CPICH info is needed by the mobile device to detect, which neighbouring cells are in the range of the mobile device. The measurement then may be used for e.g. a handover decision or decision from which cells the mobile device shall receive information or to which cells it may setup or maintain a connection; i.e., which cells shall be in the so-called "Active Set" or in other sets as the "Monitored set" or the "Detected Set".

The SIB11 may include the following information:
 measurement control system information;
 inter-frequency measurement system information;

inter-frequency cell info list;
cell info;
Primary CPICH info.

Each of the later information elements in this list is transmitted in the information element further above in the list or in the message further above in the list.

In an inactive mode, e.g. idle state, URA_PCH or CELL_PCH state, the mobile device receives the system information message which is broadcast by the network. When the mobile device changes to an active mode, e.g. CELL_DCH state, the mobile device receives a measurement message for cell measurements over a dedicated channel which the network has assigned in conjunction with the connection request.

In UMTS, the transmission of data in uplink direction and downlink direction may take place via one or more common/shared channels or via one or more dedicated channels. This is signaled by the network to the mobile device during the setup of a communication connection. The decision about that (whether a common/shared channel or a dedicated channel should be used) is made by the network in dependence on the traffic load of the radio cell as well as the type of the service and the necessary quality of service. In general, the mobile device may send an initial request for the connection setup to the mobile network over the RRC-message "RRC Connection Request", as shown in Table 1.

TABLE 1

RRC Connection Request

RRC Connection Request
First message transmitted by the UE when setting up
an RRC connection to the network.
RLC-SAP: TM
Logical channel: CCCH
Direction: UE→ UTRAN

| Information Element/ Group name | Need | Multi | Type and reference | Semantics Description | Version |
|---|---|---|---|---|---|
| Message Type | MP | | Message Type | | |
| Radio Bearer IEs | | | | | |
| Predefined configuration status information | MP | | Boolean | True indicates the UE has all pre-configurations stored with the same value tag as broadcast in the cell in which the RRC connection establishment is initiated | REL-5 |
| UE information elements | | | | | |
| Initial UE identity | MP | | Initial UE identity 10.3.3.15 | | |
| Establishment cause | MP | | Establishment cause 10.3.3.11 | | |
| Protocol error indicator | MD | | Protocol error indicator 10.3.3.27 | Default value is false | |
| >UE Specific Behaviour Information 1 idle | OP | | UE Specific Behaviour Information 1 idle 10.3.3.51 | This IE shall not be included in this version of the protocol | |
| Domain indicator | MP | | CN domain identity 10.3.3.1 | | REL-6 |
| Call Type | CV-CS-domain | | Enumerated (speech, video, other) | One spare value is needed | REL-6 |
| UE capability indication | OP | | Enumerated (HS-DSCH, HS-DSCH + E-DCH) | Absence of this IE implies that neither HS-DSCH nor E_DCH are supported by the UE | REL-6 |
| MBMS Selected Services | OP | | MBMS Selected Services Short 10.3.9a.7d | | REL-6 |
| Measurement Information Elements | | | | | |
| Measured results on RACH | OP | | Measured results on RACH 10.3.7.45 | | |
| Access Stratum release indicator | MP | | Enumerated (REL-4 REL-5 REL-6) | Absence of this IE implies R99. The IE also indicates the release of the RRC transfer syntax supported by the UE. 13 spare values are needed | REL-4 REL-6 REL-6 |

| Condition | Explanation |
|---|---|
| CS-domain | This IE is mandatory present if the IE "Domain indicator" has the value "CS domain". Otherwise it is not needed. |

If the encoded message does not fill a transport block, the RRC layer shall insert padding according to subclause 12.1

Within an established radio connection the mobile device may be notified over a "measurement control" message, as shown in the following Table 2, again on which radio cells it should perform measurements (e.g. inter-frequency measurements).

TABLE 2

Measurement Control

Measurement Control
This message is sent by UTRAN to setup,
modify or release a measurement in the UE.
RLC-SAP: AM
Logical Channel: DCCH
Direction: UTRAN→UE

| Information Element/Group name | Need | Type and Multi | Semantics reference Description |
|---|---|---|---|
| Message Type | MP | | Message Type |
| UE information elements | | | |
| RRC transaction identifier | MP | | |
| Integrity check info | CH | | |
| Measurement Information elements | | | |
| Measurement Identity | MP | | Measurement Identity 10.3.7.48 |
| Measurement Command | MP | | Measurement Command 10.3.7.46 |
| Measurement Reporting Mode | OP | | Measurement Reporting Mode 10.3.7.49 |
| Additional measurement list | OP | | Additional measurement list 10.3.7.1 |
| CHOICE Measurement type | CV-command | | |
| >Intra-frequency measurement | | | Intra-frequency measurement 10.3.7.36 |
| >Inter-frequency measurement | | | Inter-frequency measurement 10.3.7.16 |
| >Inter-RAT measurement | | | Inter-RAT measurement 10.3.7.27 |
| >UE positioning measurement | | | UE positioning measurement 10.3.7.100 |
| >Traffic Volume measurement | | | Traffic Volume measurement 10.3.7.68 |
| >Quality measurement | | | Quality measurement 10.3.7.58 |
| >UE internal measurement | | | UE internal measurement 10.3.7.77 |
| Physical channel information elements | | | |
| DPCH compressed mode status info | | | DPCH compressed mode status info 10.3.7.34 |

TABLE 2-continued

Measurement Control

| Condition | Explanation |
|---|---|
| Command | This IE is mandatory present if the IE "Measurement command" is set to "Setup", Optional if the IE "Measurement command is set to "modify". Otherwise it is not needed. |

The configuration of the measurements according to the Measurement Control message differs in most cases from the configuration of the system information SIB11. For the mobile device, however, the configuration of the messages via the RRC message "measurement control" is mandatory. Although the constellation and the parameters of the neighboring cells hasn't changed, amongst others, the information element "Cell Info" may be transmitted to the mobile device again which contains several parameters describing the radio cell, as e.g. the Primary CPICH info.

In an embodiment, the Measurement Control message contains the following information:
Inter-frequency cell info list;
Cell info;
Primary CPICH info.

The mobile device then may perform the configured measurements and notifies the results to the mobile network in a Measurement Report Message. For that, the mobile device transmits, amongst others, the Cell Measurement Results, which also contains several parameters describing the radio cell; as e.g. also the Primary CPICH info.

In an embodiment, the Measurement Report message contains the following information:
Measurement Results;
Inter-frequency measured results list;
Cell measured results;
Primary CPICH info.

The mobile device hence decodes the Measurement Control message and configures its measurements according to the decoded message and performs the measurements.

The difficulty of this conventional method is obviously the high redundancy of the information about neighboring cells and the configuration of measurements. The same information is transmitted repeatedly between mobile device and mobile network. This leads to a high signaling load and limits thereby the available bandwidth.

In LTE systems mobile devices are denominated as User Equipment (UE) 306. The communication network may be subdivided into the core network (Evolved Packet Core, EPC) 300, which may include amongst others the Access Gateway (aGW) 312 and the radio access network (RAN) 302, which may include the base stations (evolved Node B, eNB) 310, as shown in FIG. 3.

At present, discussions about an efficient signaling of control data over the LTE air interface take place in the standardization group 3GPP TSG RAN WG2 with the objective to reduce the number of control data in order to conserve the resources of the air interface and to reduce the latencies.

Embodiments provide a reduction of the number of control data in order to preserve the resources of the air interface and to reduce the latency.

FIG. 4. shows a method 400 for processing measurement control information in a communication device according to an embodiment. According to this method 400, in 402, the communication device, being in a first communication network layer connection state, receives at least one signaling message containing measurement control information indicating which measurements should be carried out by the communication device in the first communication network layer connection state. In 404 the communication device stores the measurement control information. In 406, the mobile communication device changes the communication network layer connection state from the first communication network layer connection state into a second communication network layer connection state; and, in 408, the communication device being now in the second communication network layer connection state generates a measurement status message containing an indication information about the stored measurement control information.

Thus, a method for signaling parameters between the mobile device and the mobile network to obtain an efficient configuration of measurements of the current and neighboring radio cells is provided. For that, the mobile device being e.g. in a RRC state where it receives system information messages reads conventionally the system information, as e.g. the SIB11 message, and thereafter performs measurements in the current and the neighboring cells. The mobile device stores these parameters of the system information including e.g. a version number, e.g. a value tag from the scheduling information.

When the mobile device thereafter changes its RRC state to a state, as e.g. the Connected Mode in which it wants to transmit its data over e.g. dedicated radio channels, it sends a message, e.g. a RRC Connection Request message to setup a signaling connection to the radio network.

According to an embodiment, this RRC Connection Request message may include an information element that indicates which system information, especially from SIB11, the mobile device has already read and stored. To do this, according to an embodiment, e.g. the value tag or the value tags may be used.

By applying the method 400, the communication device may on the one hand re-use the stored information, even when it changes its connection state and on the other hand the receiver of the generated message, e.g. a base station or a so-called NodeB or eNB, may determine a certain action as explained further below, to reduce the amount of signaling between the communication device and that receiver.

According to an embodiment, the first communication network layer connection state and the second communication network layer connection state are mobile radio communication network layer connection states.

The communication network layer may be a layer of a mobile communication system, as e.g. UMTS, LTE, CDMA2000, FOMA, or similar systems, especially advanced system evolving from these existing systems. In general, all communication systems are addressed, in which a communication layer includes more than one connection state, and the communication device may receive information regarding measurements which the communication device has to perform and in which this system information is transmitted in more than one connection state from the network system.

According to an embodiment, the first communication network layer connection state and the second communication network layer connection state are Radio Resource Control connection states.

The RRC connection is defined as a point-to-point bi-directional connection between RRC peer entities in the UE and e.g. in UMTS the UTRAN characterized by the allocation of a U-RNTI (UTRAN Radio Network Temporary Identifier). A UE has either zero or one RRC connection.

The RRC layer has been described above. In the following its states are presented in more detail with respect to various embodiments.

Figure 5A:
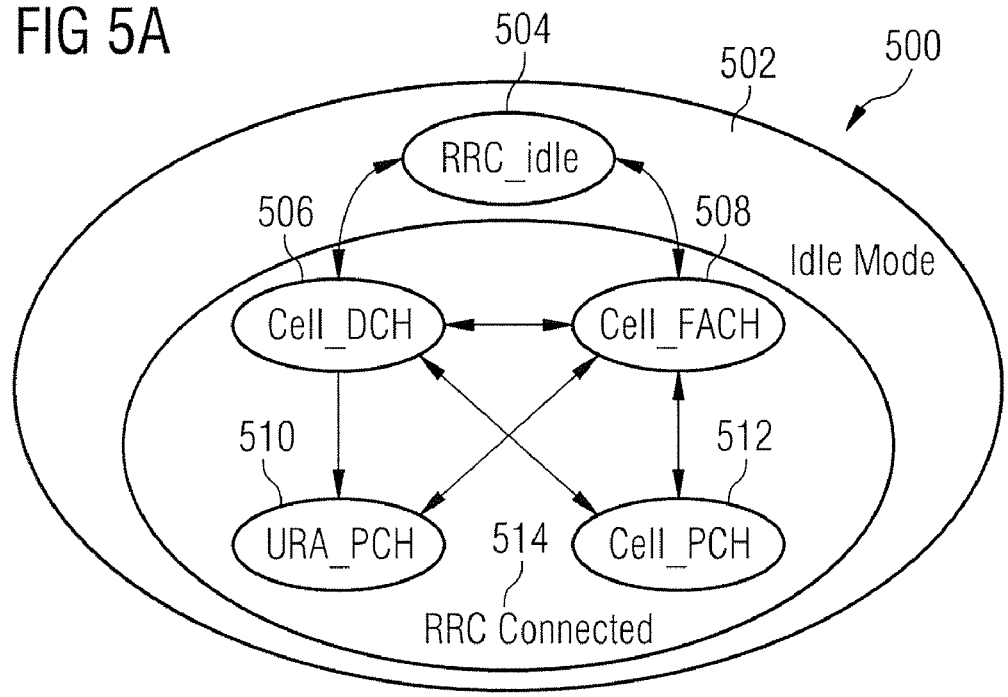
FIGS. 5A and 5B show the RRC state machines of UMTS and LTE and the correspondence of LTE and UMTS states, respectively.

As shown in FIG. 5A, there are two modes in which a mobile device may reside: the Idle Mode 502 with the RRC_idle state 504 and the RRC Connected mode 514 which contains the Cell_DCH state 506, the Cell_FACH state 508, the URA_PCH state 510 and the Cell_PCH state 512.

In UMTS RRC idle mode 502 there is only one state, RRC_idle 504. This state 504 is entered after switching on the mobile device. In RRC_idle 504 the UTRAN has no information about the mobile device. In downlink direction, the mobile devices listen to the PICH/PCH (Paging Indicator CHannel/Paging Channel). To change into the RRC connected mode 514 a paging signal has to be detected. The PICH serves e.g. as wake-up signal in this state 504.

The UTRAN can only send information to mobile devices in Idle Mode 502 by sending a broadcast message, e.g., inside a cell. In uplink direction the UE sends a RRC Connection Request message on the RACH to change into the RRC Connected Mode 514.

In UMTS the UE enters the CELL_FACH 508 or CELL_DCH 506 state when it receives a message from the network that confirms the RRC connection establishment. In this description under the term "changing the connection state" may also be understood, that the communication device, as e.g. the mobile device, changes its connection state when taking its first action to change a state. Thus, this term may not mean exactly the same in respect of the point of time, when the mobile is regarded to have changed its state.

In the following only the most important features in respect to the invention of the four UMTS RRC states 506, 508, 510, 512 of the connected mode RRC Connected 514 are mentioned.

One of the connected mode states is the CELL_DCH state 506. In this state a dedicated physical channel is allocated to the mobile device in uplink and downlink direction. The mobile device sends Measurement Reports to the RNC according to the Measurement Control information. The mobile device enters the CELL_DCH 506 state when setting up a RRC connection from the Idle state 504 or by establishing a dedicated physical channel from the CELL_FACH state 508.

The CELL_FACH state 508 is a further state of the connected mode 514. In this state 508, no dedicated physical channel is allocated to the mobile device. In downlink the mobile device listens to all FACHs in the cell. The mobile device listens to the BCH (Broadcast Channel) transport channel of the serving cell for the decoding of system information messages. In this state 508, the mobile device sends Measurement Reports to the RNC (Radio Network Controller).

A third state is the CELL_PCH state 512. In this state no dedicated channel is allocated to the mobile device. In order to commence an uplink activity a change to the CELL_FACH state 508 is necessary. In this state 512, the mobile device sends Measurement Reports to the RNC (Radio Network Controller). It monitors the PCH (paging channel). Furthermore, the mobile device listens to the BCH transport channel of the serving cell for the decoding of system information messages. As the DCCH logical channel cannot be used in this state 512, the network has to send a paging request on the PCCH in order to initiate any downlink activity.

The fourth state in connected mode is the URA_PCH state 510. The URA_PCH state 510 is similar to the CELL_PCH state 512 and basically differs from that state 512 in that URA updates are initiated instead of cell updates as in the CELL_

PCH 512 case. In order to transmit anything to the UTRAN the mobile device has to change the CELL_FACH state 508 first. The transition to the URA_PCH 510 state can be controlled by an inactivity timer or a counter which counts the number of cell updates. When the number of cell updates has exceeded a threshold the UE changes to the URA_PCH 510 state.

Figure 5B:
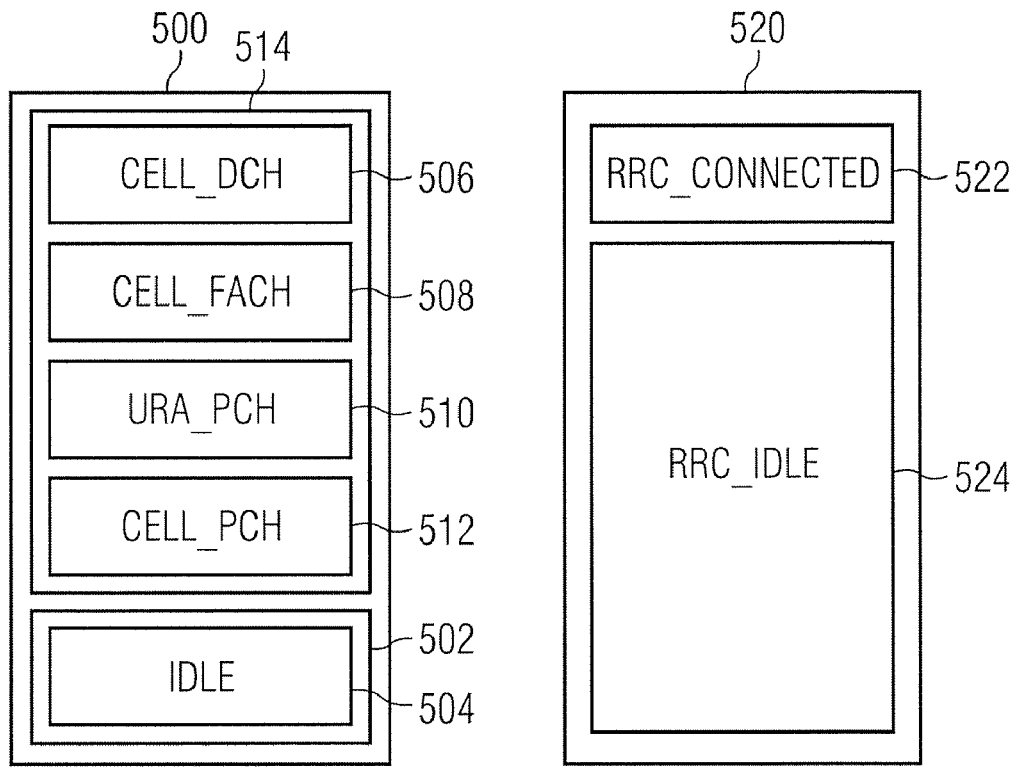

In LTE, RRC States were restricted to RRC_Idle 524 and RRC_Connected 522 states, as shown in FIG. 5B in conjunction with the possible legacy UTRAN RRC states.

As can be seen in FIG. 5B the UMTS CELL_FACH 508 state and the CELL/URA_PCH states 510, 512 may in LTE correspond to the RRC_IDLE 524 state.

Figure 6:
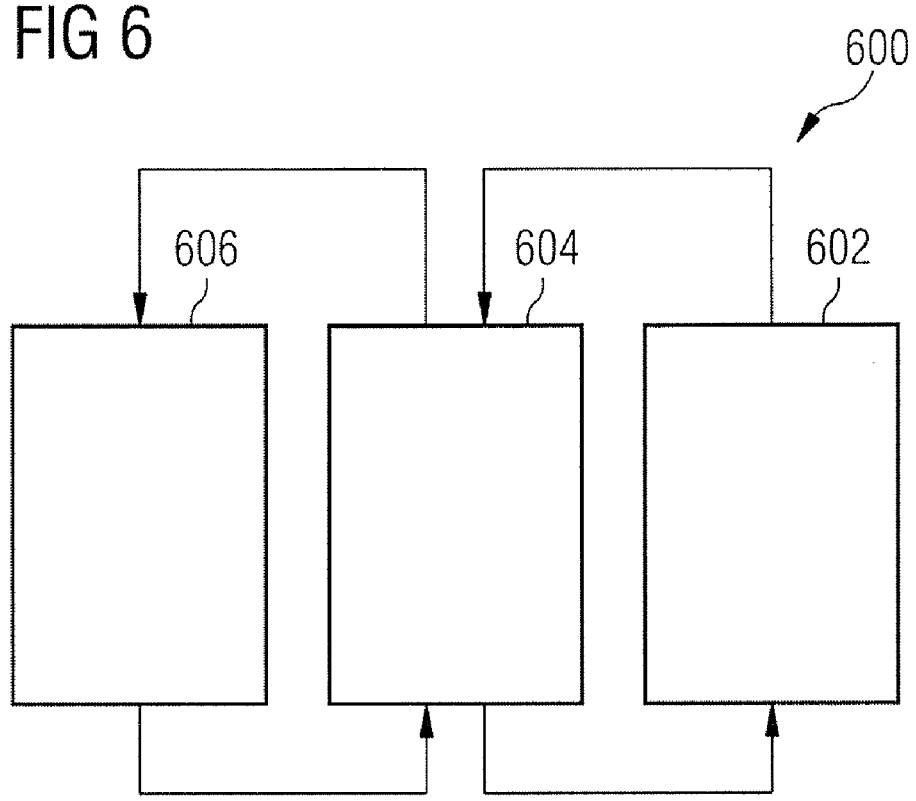
FIG. 6 shows the RRC state machine of LTE.

Besides of these two RRC states 522, 524 in LTE, three LTE NAS (Non-Access-Stratum) states exist, namely the LTE_DETACHED state 602, the LTE_ACTIVE state 604 and the LTE_IDLE state 606, as illustrated in FIG. 6. The LTE_DETACHED state 602 is entered when the mobile device is powered up. No RRC resources are available to the mobile device in this state. The corresponding RRC "state" may be denominated "NULL". The UE is not performing Uplink/Downlink transfer, has a low power consumption. The LTE_ACTIVE state 604 is entered when a "Registration" is performed, i.e. a C-RNTI (Cell-Radio Network Temporary Identity) is allocated, an authentication is performed, and a security relation is established.

In the LTE_ACTIVE state 604, the RRC state is RRC_CONNECTED 522. In this state 604, the connection context includes all information necessary for communication. An cell-unique ID, an ID unique in the Tracking Area and an IP address are assigned. The UE position is known by the network at cell level. In RRC_CONNECTED state 522, upload activity is possible.

When the mobile device is inactive the LTE_IDLE state 606 is entered and the RRC state is changed to RRC_IDLE 524. The mobile device keeps its Tracking Area ID and the IP address and is tracked by the network. The connection context includes information to enable a fast transition to the LTE_ACTIVE state 604, as e.g. security key information. If the mobile has data to send, again the LTE_ACTIVE state 604 is entered.

From either the LTE_IDLE state 606 or the LTE_ACTIVE 604 state the LTE_DETACHED 602 state is entered either due to a timeout of periodic TA (tracking area) updates or due to a change of the PLMN (Public Land Mobile Network) or deregistration.

According to an embodiment, the first communication network layer connection state is an idle mode state.

In an idle mode state, the communication device is usually inactive and has no active connection. This means, it listens only to certain channels, as e.g. a broadcast or paging channel. The listening to these channels may also be a scheduled listening, where the mobile "wakes up" at pre-determined points of time in contrary to a continuously monitoring of these channels.

According to an embodiment, the first communication network layer connection state is an Radio Resource Control idle mode state. That is, no resources for an active RRC link, as e.g. a dedicated channel in UMTS, are allocated, and, e.g. no upload from the mobile device to the network is possible.

According to an embodiment, the first communication network layer connection state is a state in which the communication device has no active data transmission connection to a communication network; and the first communication network layer connection state is a state in which the communication device is configured to read system information of the communication network as the at least one signaling message (e.g. of the radio cell of a radio communication network).

I.e., the communication device receives the messages broadcast by the network. In a mobile communication system, this may be the broadcast channel and/or the paging channel. The system information may be transmitted by the network by e.g. the broadcast channel and may organized in a specific structure, as e.g. blocks containing so-called system information elements.

Thus, according to an embodiment, the first communication protocol network layer connection state is a state in which the communication device is configured to read a system information block as the at least one signaling message of the communication network.

Figure 7:
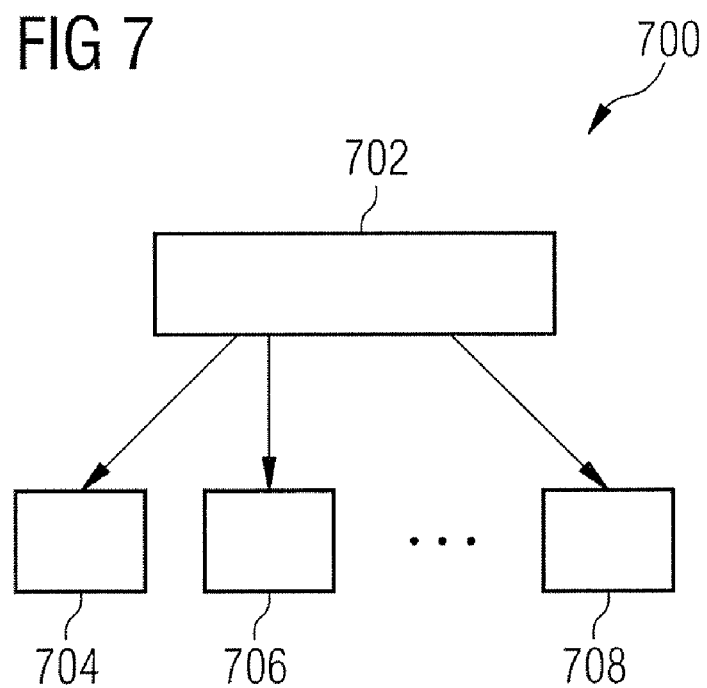
FIG. 7 shows the structure of the UMTS SIB messages.

The actual system information may be broadcast in system information elements, as depicted in FIG. 7. System information elements with similar characteristics, for example, regarding their repetition rate 704, 706, 708 may be grouped together to an SIB (System Information Block) 704, 706, 708. A master information block 702 may be used to specify what system information blocks 704, 706, 708 are in use in a cell, and how they should be accessed. A Master Information Block (MIB) 702 gives references to a number of SIBs 704, 706, 708 in a cell, including scheduling information for those SIBs 704, 706, 708. Nearly all SIBs use a random ID called a value tag. As long as the value tag contains the same value, the contents of the SIBs 704, 706, 708 are unchanged. This means that a mobile device receives a SIB and stores the value tag. The mobile device compares value tags if the same SIB 704, 706, 708 occurs. If the value is equal to the stored value, then the contents of the SIB 704, 706, 708 can be discarded. If the value is different, then mobile device will read the SIB contents and store the new value tag.

Some system information elements are continuously repeated on a regular basis in accordance with the scheduling defined for each system information block. The mobile device reads system information messages broadcast on a BCH transport channel in Idle Mode or non-connected mode. In active or connected mode as e.g. the CELL_DCH 506 in UMTS or LTE_ACTIVE 604 in LTE the network may use a dedicated channel to transmit the system information elements to the mobile device. The mobile device may also read system information messages broadcast on a FACH transport channel when in the CELL_FACH state 508.

According to an embodiment, the second communication protocol network layer connection state is a Radio Resource Control connected mode state. In this state the mobile device has uplink and downlink possibilities to receive system information and to send messages as e.g. measurement reports to the communication network.

According to an embodiment, the second communication protocol network layer connection state is a Radio Resource Control CELL_DCH connected mode state.

According to an embodiment, the second communication protocol network layer connection state is a state in which a dedicated physical channel is allocated to the communication device.

As an example, a dedicated channel may be assigned to a communication system, as. e.g. UMTS, when a user is paged by the network due to an incoming call and the user accepts the call or if an outgoing call is initiated. In UMTS, the dedicated channel may be assigned in CELL_DCH state.

In an embodiment, the method 400 further includes carrying out at least one measurement in accordance with the measurement control information; and storing the result of the at least one measurement. The measurement is performed according to the configuration as defined in the system information message for the measurement.

According to an embodiment, the carrying out of the at least one measurement contains measuring the signal strength of a received signal.

The measurements may include downlink signal quality in general, i.e. for example the bit error rate, and the downlink signal strength of a signal received from its serving base station or NodeB, respectively, in whose cell it currently resides, and also the downlink signal strength from neighbouring base stations serving neighbouring cells. Further measurements may be included, as e.g. shown in Table 2.

According to an embodiment, the method 400 may further include storing the result of the at least one measurement together with a signaling message identification information identifying the at least one signaling message that contains the measurement control information that has been used for the at least one measurement.

Such a signaling message identification information may be a number as e.g. an enumerated number, a random number or a hash value or e.g. a pre-defined name.

UMTS system information may be tagged with a so-called "Value Tag" to allow the mobile devices to detect if it has received a particular system information yet and hence does not need to read it again. The Value Tag of a system information block is transmitted via the "scheduling information".

According to an embodiment, the signaling message identification information contains a value tag from the at least one signaling message. As described above, in UMTS, the value tag is created from a random number and is thus suitable to identify a certain message. However, a value tag may also be generated from e.g. an enumerated number, a hash value, or similar numbers.

According to an embodiment, the measurement status message further contains a request for establishing a dedicated signaling communication connection with the communication network.

In some systems, when establishing a dedicated signaling communication connection an active state is entered as e.g. in UMTS the CELL_DCH state. A dedicated connection does not necessarily mean that—as in UMTS—a dedicated physical channel is allocated. A dedicated connection may also be established through a physical shared channel. As an example, data packets may be transmitted via the physical shared channel, each data packet being destined for a certain mobile device. The shared channel may be used to transmit the data packets in a stream from which a mobile device extracts the data packets that are addressed to the mobile device.

In UMTS the transmission of user-specific data in uplink direction and downlink direction may take place via one or more shared channels or via one or more dedicated channels. This may be signaled by the network to the mobile device during the setup of a communication connection. The decision about that may be made by the network in dependence on the traffic load of the radio cell as well as the type of the service and the necessary quality of service. In general, the mobile device may send an initial request for the connection setup to the mobile network over the RRC-message "RRC Connection Request", as shown in Table 1.

According to an embodiment, the measurement status message contains a Radio Resource Control Connection Request message. With this message the RRC connection may be initiated, leading to the setting up of a dedicated connection where uploads and download are possible.

According to an embodiment, the method 400 is carried out in a radio communication terminal device. Such a radio communication terminal device may also be denominated "User Equipment" (UE) in e.g. UMTS or LTE. It may be any kind of radio communication terminal device as e.g. a mobile phone, a PDA (Personal Digital Assistant), or any hybrid multimedia/radio communication device or alike capable to communicate according to a communication standard with a protocol stack similar to that described herein and also a system information and measurement information exchange mechanism as described herein.

Figure 8:
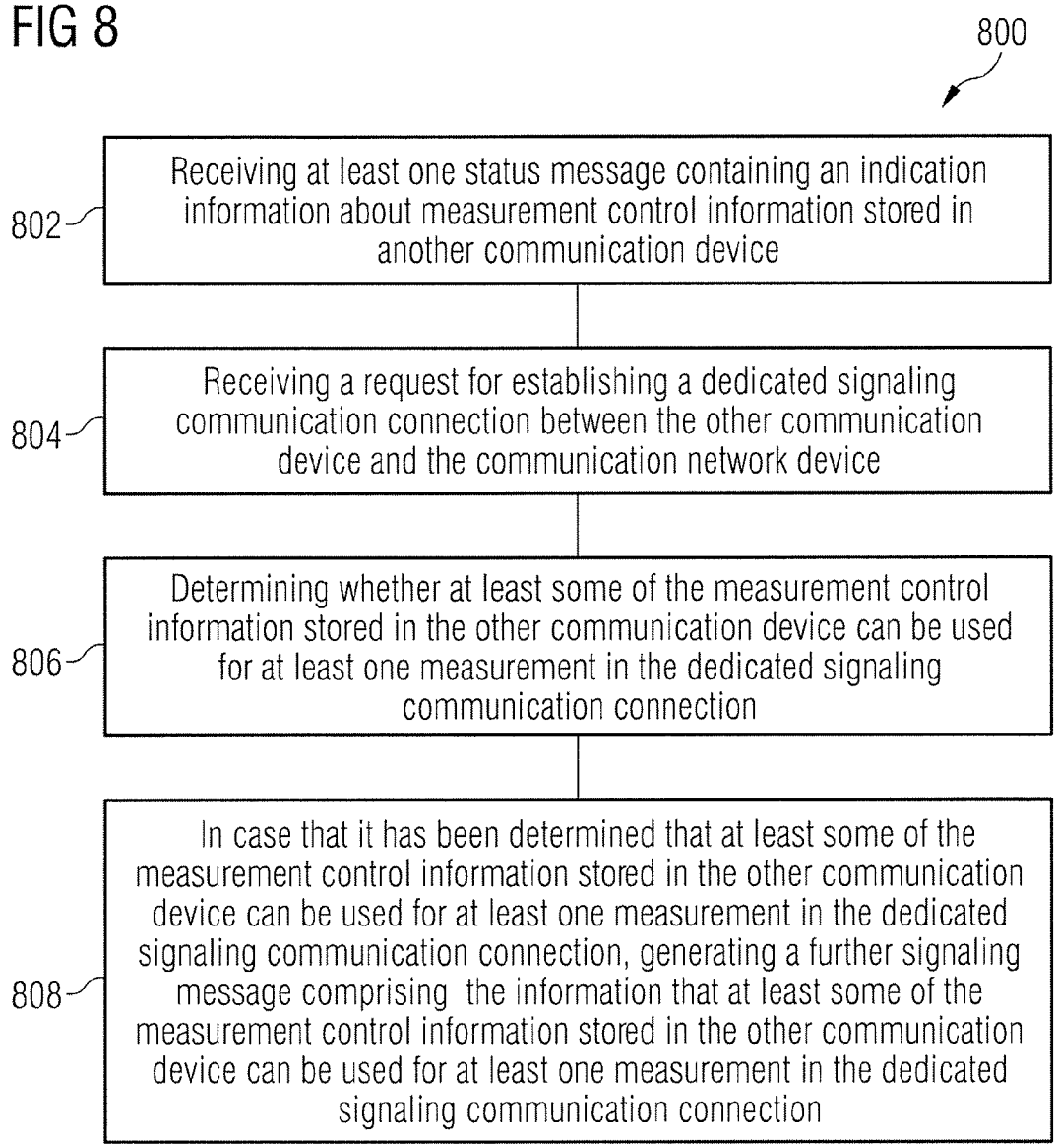
FIG. 8 shows a second method for processing measurement control information according to an embodiment.

FIG. 8 shows in an embodiment a further method for generating measurement control information in a communication network device. According to this embodiment, in 802, at least one status message containing an indication information about measurement control information stored in another communication device is received. In 804, a request for establishing a dedicated signaling communication connection between the other communication device and the communication network device is received. In 806, it is determined whether at least some of the measurement control information stored in the other communication device can be used for at least one measurement in the dedicated signaling communication connection; and in 808, in case that it has been determined that at least some of the measurement control information stored in the other communication device can be used for at least one measurement in the dedicated signaling communication connection, generating a further signaling message containing the information that at least some of the measurement control information stored in the other communication device can be used for at least one measurement in the dedicated signaling communication connection.

The method may e.g. reflect the point of view of e.g. a radio access element of the network, as e.g. a base station or a NodeB. The network sends an information that indicates, whether the mobile device shall use the yet stored parameters read by the mobile device from the system information for further measurements.

Referring again to the method 800, according to an embodiment, in case that it has been determined that the measurement control information stored in the other communication device cannot be used for at least one measurement in the dedicated signaling communication connection, generating a further signaling message containing measurement control information indicating which measurements should be carried out in the dedicated signaling communication connection between the other communication device and the communication network device.

In other words, the communication network device, as e.g. a base station or NodeB, respectively, has detected that the stored measurement configuration in e.g. the mobile device is not suitable or sufficient for performing measurements in respect to other communication devices of the current cell and/or the neighboring cells. In this case, e.g. the communication network device sends the necessary measurement information to the mobile device which can add the information to the stored information or replace the stored or a part of the stored information by the information from the communication network device.

Here again, the term "dedicated connection" does not necessarily mean that a dedicated physical channel had already been allocated.

According to an embodiment, the communication device is in one or more communication network layer connection states.

The communication network layer may e.g. be a Radio Resource Control layer. Thus, according to a further embodiment the communication network device may be in one or more Radio Resource Control connection states.

Examples of Radio Resource Control connection states are in UMTS e.g. as described above and shown in FIGS. 5A and 5B the CELL_FACH 508, CELL_PCH 512, URA PCH 510, and CELL_DCH 506 in UMTS; and in LTE there may be an RRC_IDLE state 524 and an RRC_CONNECTED state 522.

According to a further embodiment, the status message may include a value tag from at least one signaling message. In that way, the communication network device may get knowledge which measurement control information the other communication device has stored so far; and the communication network device may make a decision about the contents of next measurement control message as will be stated in the following embodiments.

The value tag may be an identifier to mark a message, which is built from a random number, an enumerated number or a number generated from the message content as e.g. a hash value.

According to an embodiment, the status message may further include the request for establishing a dedicated signaling communication connection with the communication network device.

With the request for establishing a dedicated signaling communication connection the mobile is changing its communication network layer connection state. The definition of the exact point of time when the mobile is changing its communication protocol network layer connection may differ from system to system. Nevertheless, the mobile device is changing its state during the course of transmitting the status message which may be, according to an embodiment, a Radio Resource Control Connection Request message, and receives later the reply from the network communication device.

Figure 9:
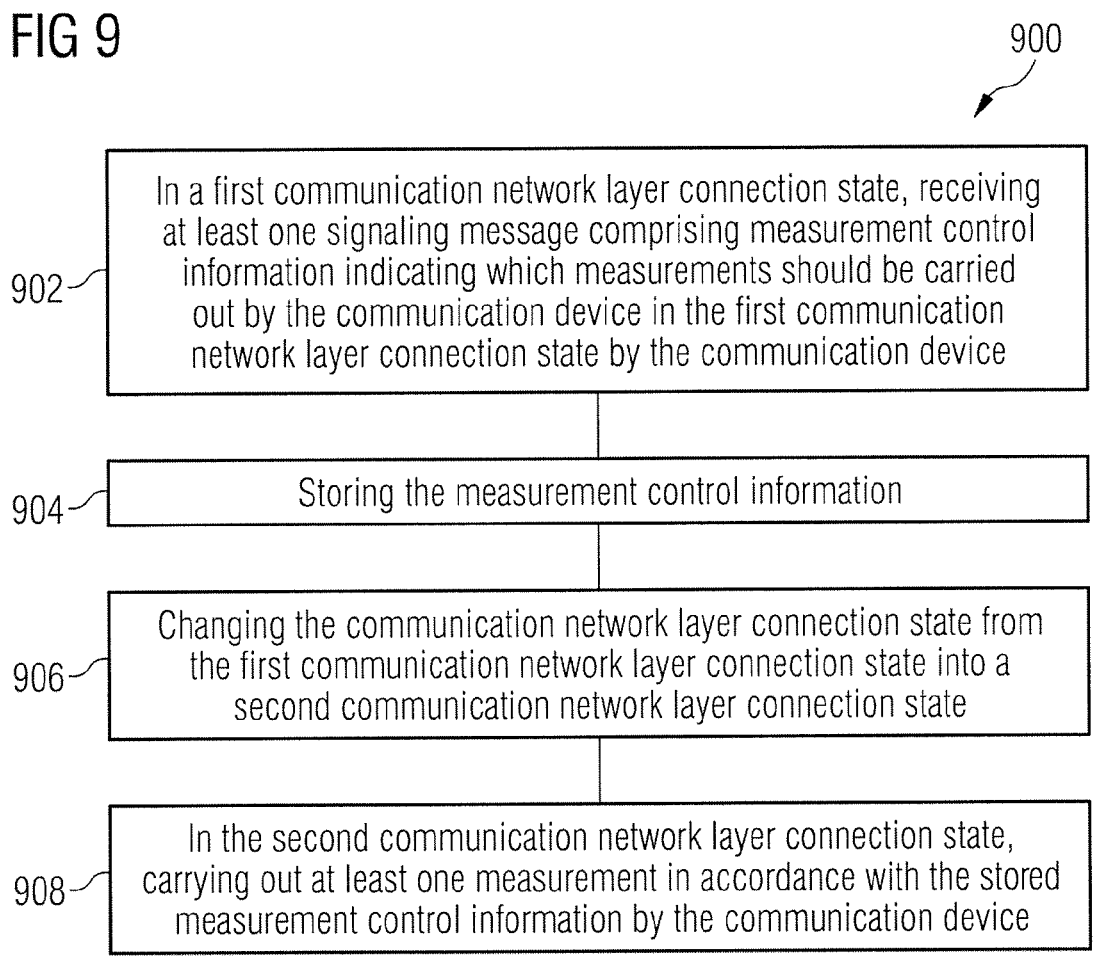
FIG. 9 shows a third method for processing measurement control information according to an embodiment.

According to an embodiment, a method 900 for processing measurement control information in a communication device is provided as shown in FIG. 9.

In 902, the communication device receives at least one signaling message containing measurement control information in a first communication protocol network layer connection state indicating which measurements should be carried out by the communication device in the first communication protocol network layer connection state.

In 904, the communication device stores the measurement control information.

In 906, the communication device changes the communication protocol network layer connection state from the first communication protocol network layer connection state into a second communication protocol network layer connection state; and, in 908, the communication device being in the second communication protocol network layer connection state carries out at least one measurement in accordance with the stored measurement control information.

According to an embodiment, the method 900 further includes receiving a further signaling message containing the information that at least some of the measurement control information stored in the communication device can be used for at least one measurement in the dedicated signaling communication connection; and upon receipt of the further signaling message, the communication device carrying out the at least one measurement in accordance with the stored measurement control information.

According to an embodiment, the first communication protocol network layer connection state and the second communication protocol network layer connection state are mobile radio communication protocol network layer connection states.

According to an embodiment, the first communication protocol network layer connection state and the second communication protocol network layer connection state are Radio Resource Control connection states.

According to an embodiment, the first communication protocol network layer connection state is an idle mode state.

According to an embodiment, the first communication protocol network layer connection state is an Radio Resource Control idle mode state.

According to an embodiment, the first communication protocol network layer connection state is a state in which the communication device has no active data transmission connection to a communication network; and the first communication protocol network layer connection state is a state in which the communication device is configured to read system information of the communication network as the at least one signaling message (e.g. of the radio cell of a radio communication network).

According to an embodiment, the first communication protocol network layer connection state is a state in which the communication device is configured to read a system information block as the at least one signaling message of the communication network.

According to an embodiment, the second communication protocol network layer connection state is a state in which a dedicated physical channel is allocated to the communication device.

According to an embodiment, the second communication protocol network layer connection state is a Radio Resource Control connected mode state.

According to an embodiment, the second communication protocol network layer connection state is a Radio Resource Control CELL_DCH connected mode state.

In an embodiment, the method may further include: carrying out at least one measurement in accordance with the measurement control information; and storing the result of the at least one measurement.

According to an embodiment, the carrying out the at least one measurement may include measuring the signal strength of received signals.

According to an embodiment, the method 900, may further include: storing the result of the at least one measurement together with a signaling message identification information identifying the at least one signaling message that contains the measurement control information that had been used for the at least one measurement.

According to an embodiment, the signaling message identification information may include a value tag from the at least one signaling message.

According to another embodiment, the measurement status message may further include a request for establishing a dedicated signaling communication connection with the communication network.

According to an embodiment, the measurement status message may include a Radio Resource Control Connection Request message.

According to another embodiment, the method 900 may be carried out in a radio communication terminal device.

Figure 10:
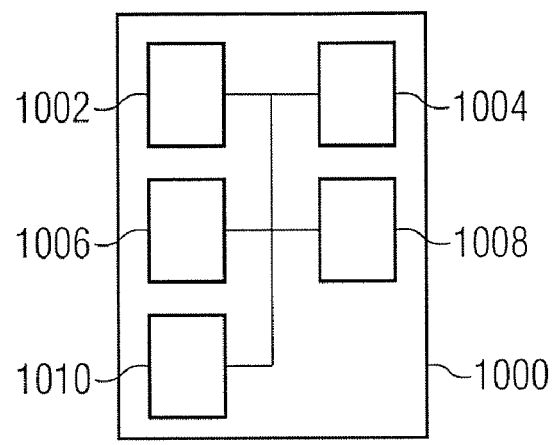
FIG. 10 shows a first communication device according to an embodiment.

FIG. 10 shows a communication device 1000 according to a further embodiment.

The communication device according to this embodiment may include a receiver 1002 configured to receive in a first communication network layer connection state at least one signaling message containing measurement control information indicating which measurements should be carried out by the communication device 1000 in the first communication network layer connection state; a memory 1004 configured to store the measurement control information; a controller 1006 to control a change of the communication network layer connection state from the first communication network layer connection state into a second communication network layer connection state; a message generator 1008 configured to generate, in the second communication network layer connection state, a measurement status message containing an indication information about the stored measurement control information.

In FIG. 10, only those parts of the communication device are shown that are relevant for the illustration of this embodiment. A communication device may also contain an antenna, keyboard, display, multimedia sub-devices, etc. The modules shown in FIG. 10 are directly or indirectly connected to each other, via e.g. one or more system buses or lines such that a data exchange is possible.

According to an embodiment, the first communication protocol network layer connection state and the second communication protocol network layer connection state are mobile radio communication network layer connection states.

As described further above in this description the communication device 1000 may be a UE according to a mobile communication standard as e.g. UMTS or LTE based on a mobile communication protocol stack. The protocol stack may have at least one communication protocol layer responsible for the connection between the communication device 1000 and a communication network device, as e.g. a base station, NodeB or eNB. The layer may be a communication protocol network layer for which different connection states are defined. The connection states may represent the connection level, as e.g. number of usable channels, connection context, security state etc. By way of example, a first state or a first group of states may exist in which the communication device 1000 is active and a second state or a second group of states may exist in which the communication device is inactive or idle. The communication device may change the states as needed. The changes of the states may be performed by the controller 1006 of the communication device 1000. In each of these states measurements have to be performed based on configuration information transmitted by the network and received by the receiver 1002 of the communication device 1000. The network may broadcast these measurement control information in first state to the communication device 1000. Under the term broadcast it may be understood, that no dedicated connection is used. The information may be contained in a message, that also contains a further information determining the identity of the message itself. The communication device 1000 stores the message identity information in its memory 1004 and carries out the measurements. If the communication device 1000 wants to change its connection state to an active state the message generator 1008 generates a status message that indicates the network the request of the change of its state and that contains an indication information about the stored measurement control information.

According to an embodiment, the first communication protocol network layer connection state and the second communication protocol network layer connection state are Radio Resource Control connection states.

According to an embodiment, the first communication protocol network layer connection state is an idle mode state.

According to an embodiment, the first communication protocol network layer connection state is an Radio Resource Control idle mode state.

According to an embodiment, the first communication protocol network layer connection state is a state in which the communication device 1000 has no active data transmission connection to a communication network; and the first communication protocol network layer connection state is a state in which the communication device 1000 is configured to read system information of the communication network as the at least one signaling message (e.g. of the radio cell of a radio communication network).

According to an embodiment, the first communication protocol network layer connection state is a state in which the communication device 1000 is configured to read a system information block 704, 706, 708 as the at least one signaling message of the communication network.

A possible mechanism of system information transmitted in system information blocks (SIBs) 704, 706, 708, in which system information elements are transmitted, was explained above referring to FIG. 7. E.g., in UMTS a SIB 704, 706, 708 that contains the measurement control information, the SIB11, is defined.

According to an embodiment, the second communication protocol network layer connection state is a state in which a dedicated physical channel is allocated to the communication device 1000.

According to an embodiment, the second communication protocol network layer connection state is a Radio Resource Control connected mode state.

According to an embodiment, the second communication protocol network layer connection state is a Radio Resource Control CELL_DCH connected mode state 506.

According to an embodiment, the controller 1006 is configured to carry out at least one measurement in accordance with the measurement control information; and the memory 1004 is configured to store the result of the at least one measurement.

According to an embodiment, the communication device further contains a measuring circuit 1010 configured to measure the signal strength of a received signal.

However, further parameters, as e.g. quality of service parameters as e.g. the bit error rate may be measured. The measurement control information may include an information which signals have to be measured by the communication device 1000. The signals to be measured may be radiated by different communication network devices as e.g. the base stations, or NodeBs/eNBs of the neighboring cells. The signals may e.g. be signals of CPICH channels.

According to an embodiment, the controller 1006 is further configured to store the result of the at least one measurement together with a signaling message identification information identifying the at least one signaling message that contains the measurement control information that had been used for the at least one measurement.

The message generator 1008 may generate a message that includes the at least one measurement and the information identifying the at least one signaling message e.g. when requesting a change of its state, e.g. when requesting a RRC connection.

According to an embodiment, the signaling message identification information contains a value tag from the at least one signaling message.

According to an embodiment, the measurement status message further contains a request for establishing a dedicated signaling communication connection with the communication network.

According to an embodiment, the measurement status message contains a Radio Resource Control Connection Request message.

According to an embodiment, the communication device 1000 is configured as a radio communication terminal device.

Such a radio communication terminal device may also be denominated "User Equipment" (UE) in e.g. UMTS or LTE. It may be any kind of radio communication terminal device as e.g. a mobile phone, a PDA (Personal Digital Assistant), or any hybrid multimedia/radio communication device or alike capable to communicate according to a communication standard with a protocol stack similar to that described herein and also a system information and measurement information exchange mechanism as described herein.

Figure 11:
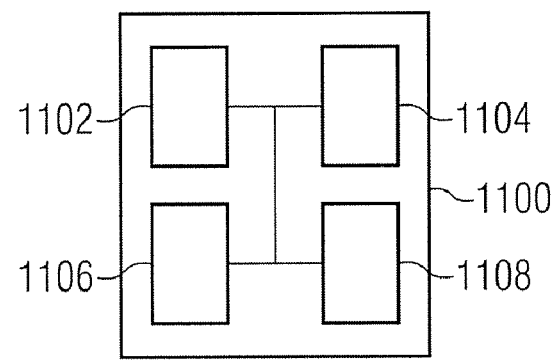
FIG. 11 shows a communication network device according to an embodiment.

FIG. 11 shows a communication network device 1100 according to an embodiment, that contains a receiver 1102 configured to receive at least one status message containing an indication information about measurement control information stored in another communication device and to receive a request for establishing a dedicated signaling communication connection between the other communication device and a communication network. It further contains a determining circuit 1104 configured to determine whether at least some of the measurement control information stored in the other communication device can be used for at least one measurement in the dedicated signaling communication connection; and a controller 1106 configured to, in case that it has been determined that at least some of the measurement control information stored in the other communication device can be used for at least one measurement in the dedicated signaling communication connection, generate a further signaling message containing the information that at least some of the measurement control information stored in the other communication device can be used for at least one measurement in the dedicated signaling communication connection.

The other communication device may e.g. be a communication device 1000 as shown in FIG. 10.

In other words, the communication network device, which may be a device of the access network of a communication system, receives a message from a communication device as e.g. the communication device 1000. The message is received and decoded by the receiver 1102 in the communication network device 1100. The received message contains e.g. an information that the communication device 1000 requests an active, e.g. a dedicated connection and an information about an measurement control message which the communication device 1000 has received and stored; and according to which it may have performed measurements. The communication network device 1100 may now decide to assign radio resources for an active connection, e.g. a dedicated connection to the communication device 1000. Furthermore, the determining circuit 1104 of the communication network device 1100 may decide to inform the communication device 1000 that the measurement configuration which it has stored is still valid, so that the communication device 1000 may use this configuration for its measurements as long as it receives no other measurement control information. The controller 1106 of the communication network device 1100 generates an according message in its message generator 1104 and transmits the message to the communication device 1000.

In FIG. 11 only those parts of the communication device are shown that are relevant for the illustration of this embodiment.

According to an embodiment, the controller 1106 is further configured to, in case that it has been determined that the measurement control information stored in the other communication device cannot be used for at least one measurement in the dedicated signaling communication connection, generate a further signaling message containing measurement control information indicating which measurements should be carried out in the dedicated signaling communication connection between the other communication device and a communication network.

In other words, according to this embodiment, the determining circuit 1104 of the communication network device 1100 decided that the measurement configuration stored by the communication device 1000 has to be altered, i.e. e.g. at least partly replaced or supplemented by a new configuration. The controller 1106 of the communication network device then generates an appropriate message which is transmitted to the communication device 1000.

According to an embodiment, the communication device is in one or more communication network layer connection states.

According to an embodiment, the communication device is in one or more Radio Resource Control connection states.

According to an embodiment, the status message contains a value tag from at least one signaling message.

According to an embodiment, the status message further contains the request for establishing a dedicated signaling communication connection with the communication network.

According to an embodiment, the status message contains a Radio Resource Control Connection Request message.

According to an embodiment, the communication network device is configured as a communication network device.

Figure 12:
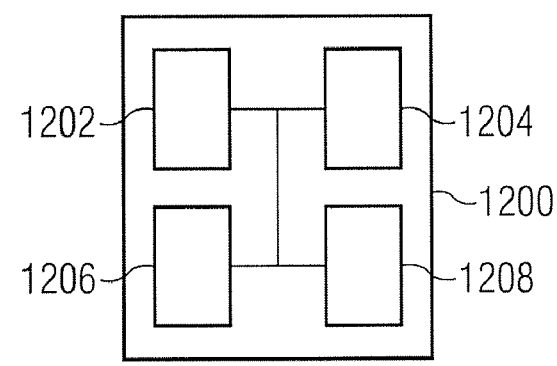
FIG. 12 shows a second communication device according to an embodiment.

FIG. 12 shows a communication device 1200 according to an embodiment, that contains a receiver 1202 configured to receive, in a first communication network layer connection state, at least one signaling message containing measurement control information indicating which measurements should be carried out by the communication device 1200 in the first communication network layer connection state; a memory 1204 configured to store the measurement control information; a controller 1206 to control a change of the communication network layer connection state from the first communication network layer connection state into a second communication network layer connection state; a measurement circuit 1208 configured to, in the second communication network layer connection state, carry out at least one measurement in accordance with the stored measurement control information.

In FIG. 12 only those parts of the communication device 1200 are shown that are relevant for the illustration of this embodiment.

According to an embodiment, the receiver 1202 is further configured to receive a further signaling message containing the information that at least some of the measurement control information stored in a communication device 1200 can be used for at least one measurement in the dedicated signaling communication connection; and the controller 1206 is configured to, upon receipt of the further signaling message, control the measurement circuit to 1208 carry out the at least one measurement in accordance with the stored measurement control information.

Summarized and in other words, according to this embodiment, the receiver 1202 of the communication device 1200 receives a first measurement control information in a first connection state. This information is stored in the memory 1204. Then, the controller 1206 controls a change to a second connection state and the receiver 1202 receives a message which either contains an indication whether the stored measurement control information may still be used or which contains new measurement control information which may contain additional measurement configurations or replace fully or partly the old measurement control information. The measurement circuit 1208 finally carries out the measurements according to this information received by the receiver 1202.

According to an embodiment, the first communication protocol network layer connection state and the second communication protocol network layer connection state are mobile radio communication protocol network layer connection states.

According to an embodiment, the first communication protocol network layer connection state and the second communication protocol network layer connection state are Radio Resource Control connection states.

According to an embodiment, the first communication protocol network layer connection state is an idle mode state.

According to an embodiment, the first communication protocol network layer connection state is an Radio Resource Control idle mode state.

According to an embodiment, the first communication protocol network layer connection state is a state in which the communication device has no active data transmission connection to a communication network; and the first communication protocol network layer connection state is a state in which the communication device is configured to read system information of the communication network as the at least one signaling message (e.g. of the radio cell of a radio communication network).

According to an embodiment, the first communication protocol network layer connection state is a state in which the communication device is configured to read a system information block as the at least one signaling message of the communication network.

According to an embodiment, the second communication protocol network layer connection state is a state in which a dedicated physical channel is allocated to the communication device.

According to an embodiment, the second communication protocol network layer connection state is a Radio Resource Control connected mode state.

According to an embodiment, the second communication protocol network layer connection state is a Radio Resource Control CELL_DCH connected mode state.

According to an embodiment, the measurement circuit 1208 is configured to carry out at least one measurement in accordance with the measurement control information; and the memory 1204 is configured to store the result of the at least one measurement.

According to an embodiment, the measurement circuit 1208 is configured to measure the signal strength of a received signal.

According to an embodiment, the controller 1206 may further be configured to store the result of the at least one measurement together with a signaling message identification information identifying the at least one signaling message that includes the measurement control information that had been used for the at least one measurement.

According to an embodiment, the signaling message identification information includes a value tag from the at least one signaling message.

According to an embodiment, the measurement status message further includes a request for establishing a dedicated signaling communication connection with the communication network.

According to an embodiment, the measurement status message includes a Radio Resource Control Connection Request message.

According to an embodiment, the communication device is configured as a radio communication terminal device.

An example is presented in the following. The example is illustrated by the diagram 1300 in FIG. 13.

Figure 13:
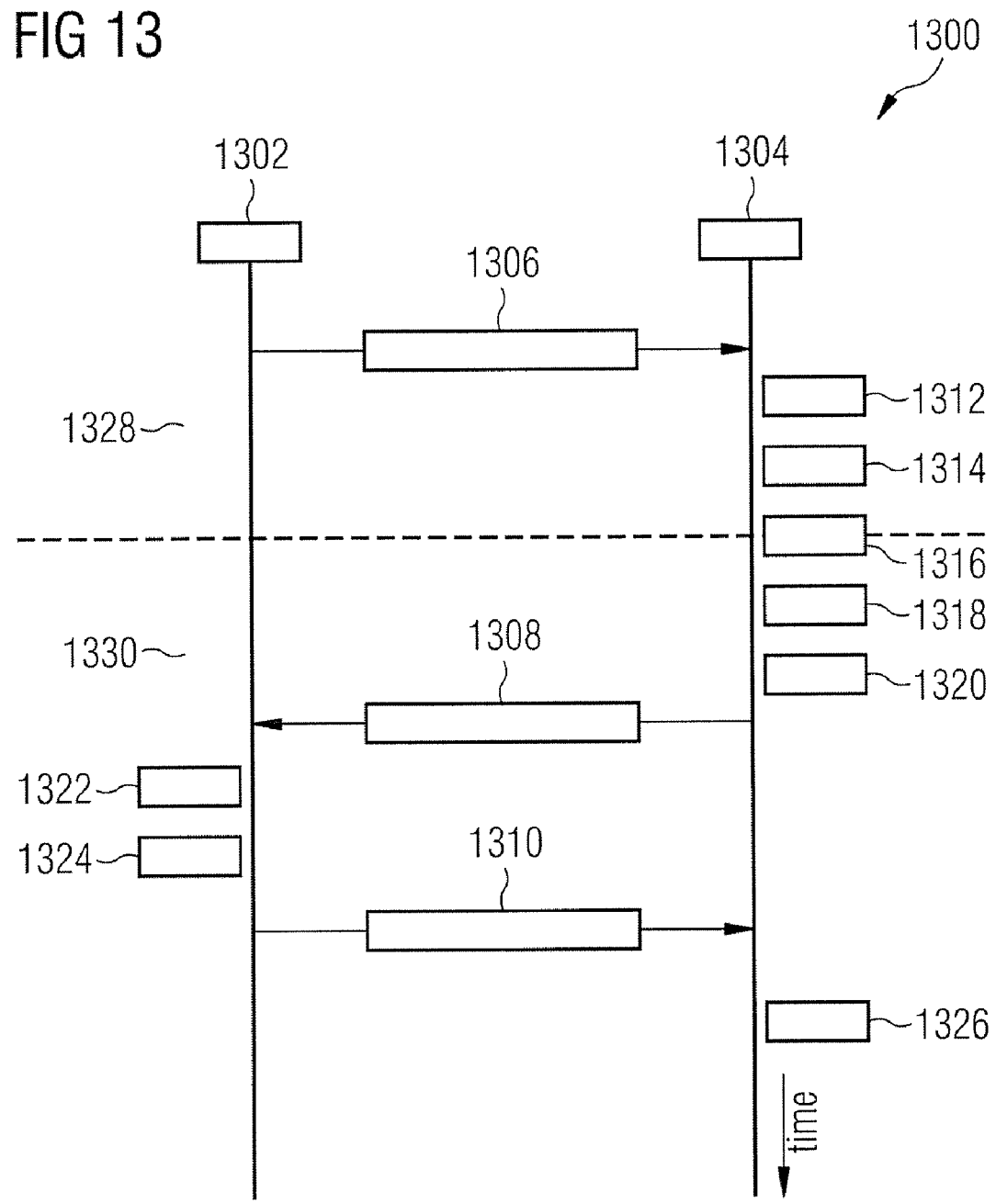
FIG. 13 shows in a time diagram an example according to an embodiment.

For this example it is supposed that a mobile device 1304 is situated in a first radio cell represented by the eNB 1302 in FIG. 13; that the mobile device 1304 has setup no active connection for transmitting data to the mobile network and that the mobile device 1304 is hence in an inactive state 1328; and that the mobile device reads the system information of the radio cell.

Among other, the mobile device reads 1312 the system information 1306, in which is communicated, on which radio cells it shall perform measurements (e.g. inter-frequency-measurements). The mobile device 1304 stores 1314 these parameters of the system information including a version number, particularly the value tag from the scheduling information. It may carry 1318 out the measurements according to the read and stored system information.

It is further supposed, that the mobile device changes 1316 to a state 1330, in which it wants to transmit its data over dedicated radio channels. It generates 1320 and transmits for that a message 1308 for the setup 1322 of a signaling connection to the radio network 1302, particularly a RRC Connection Request Message.

According to the invention this RRC Connection Request Message contains an information element "Measurement control system information version" which indicates, which system information the mobile device has read and stored before. For that, the value tag shall be used.

When the network 1302 receives the RRC Connection Request Message a dedicated channel is allocated 1322 for the mobile device 1304.

The network then generates 1324 and transmits 1310 in a Measurement Control Message an "Apply Measurement Control System Information" according to an embodiment, which indicates, whether the mobile device shall use the yet stored parameters from the system information for further measurements.

The measurement control message may furthermore contain additional information, because according to this example, only certain measurements shall be re-configured or additional measurements are configured; and other, yet according to the system information configured measurements or their parameters, respectively, shall be used further.

Finally, the measurements may be performed in 1326.

As an effect, the amount of control data on the air interface is reduced and thus, the available bandwidth for the transmission of user data is increased and the latency, e.g. for the reading of the control data and the signal processing in the mobile device is reduced.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for processing measurement control information in a communication device, the method comprising:
   in a first communication network layer connection state, the communication device receiving at least one signaling message comprising measurement control information indicating which measurements should be carried out by the communication device in the first communication network layer connection state;
   storing the measurement control information;
   changing the communication network layer connection state from the first communication network layer connection state into a second communication network layer connection state; and in the second communication network layer connection state, the communication device generating a measurement status message comprising an indication information about the stored measurement control information.

2. The method of claim 1, wherein the first communication network layer connection state and the second communication network layer connection state are mobile radio communication network layer connection states.

3. The method of claim 2, wherein the first communication network layer connection state and the second communication network layer connection state are Radio Resource Control connection states.

4. The method of claim 1, wherein the first communication network layer connection state is an idle mode state.

5. The method of claim 1, wherein the first communication network layer connection state is a state in which the communication device has no active data transmission connection to a communication network; and
wherein the first communication network layer connection state is a state in which the communication device is configured to read system information of the communication network as the at least one signaling message.

6. The method of claim 5, wherein the first communication network layer connection state is a state in which the communication device is configured to read a system information block as the at least one signaling message of the communication network.

7. The method of claim 1, wherein the second communication network layer connection state is a state in which a dedicated physical channel is allocated to the communication device.

8. The method of claim 7, wherein the second communication network layer connection state is a Radio Resource Control connected mode state.

9. The method of claim 1, further comprising:
carrying out at least one measurement in accordance with the measurement control information; and
storing the result of the at least one measurement.

10. The method of claim 9, further comprising:
storing the result of the at least one measurement together with a signaling message identification information identifying the at least one signaling message that comprises the measurement control information that has been used for the at least one measurement.

11. The method of claim 1, wherein the measurement status message further comprises a request for establishing a dedicated signaling communication connection with the communication network.

12. The method of claim 11, wherein the measurement status message comprises a Radio Resource Control Connection Request message.

13. A communication device, comprising:
a receiver configured to receive, in a first communication network layer connection state, at least one signaling message comprising measurement control information indicating which measurements should be carried out by the communication device in the first communication network layer connection state;
a memory configured to store the measurement control information;
a controller configured to control a change of the communication network layer connection state from the first communication network layer connection state into a second communication network layer connection state; and
a message generator configured to generate, in the second communication network layer connection state, a measurement status message comprising an indication information about the stored measurement control information.

14. The communication device of claim 13, wherein the controller is further configured to store a result of at least one measurement together with a signaling message identification information identifying the at least one signaling message that comprises the measurement control information that had been used for the at least one measurement.

15. The communication device of claim 13, further comprising:
a transmitter configured to transmit the measurement status message.

16. The communication device of claim 13, being configured as a radio communication terminal device.

17. A communication device, comprising:
a receiver configured to receive, in a first communication network layer connection state, at least one signaling message comprising measurement control information indicating which measurements should be carried out by the communication device in the first communication network layer connection state;
a memory configured to store the measurement control information;
a controller configured to control a change of the communication network layer connection state from the first communication network layer connection state into a second communication network layer connection state; and
a measurement circuit configured to, in the second communication network layer connection state, carry out at least one measurement in accordance with the stored measurement control information.

18. The communication device of claim 17, wherein the receiver is further configured to receive a further signaling message comprising the information that at least some of the measurement control information stored in a communication device can be used for at least one measurement in the dedicated signaling communication connection; and
wherein the controller is configured to, upon receipt of the further signaling message, control the measurement circuit to carry out the at least one measurement in accordance with the stored measurement control information.

19. The communication device of claim 17, being configured as a radio communication terminal device.

* * * * *